United States Patent
Sun et al.

(10) Patent No.: US 7,379,709 B2
(45) Date of Patent: May 27, 2008

(54) BLUETOOTH SMART MODE SWITCHING FOR SECURITY AND PRIVACY

(75) Inventors: Ray Sun, Seattle, WA (US); Michael P. Calligaro, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 10/424,531

(22) Filed: Apr. 24, 2003

(65) Prior Publication Data

US 2004/0077314 A1 Apr. 22, 2004

Related U.S. Application Data

(60) Provisional application No. 60/420,363, filed on Oct. 21, 2002.

(51) Int. Cl.
*H04B 7/00* (2006.01)
(52) U.S. Cl. .......... 455/41.2; 455/41.2; 455/575.3; 455/566; 455/575.2; 455/90.1
(58) Field of Classification Search .......... 455/41.1, 455/41.2, 375.3, 566, 575.3, 90.2, 90.1
See application file for complete search history.

(56) References Cited

U.S. PATENT DOCUMENTS

| | | | |
|---|---|---|---|
| 5,706,332 A * | 1/1998 | Nagai | 455/575.3 |
| 6,505,036 B2 * | 1/2003 | Zilberberg et al. | 455/117 |
| 6,748,195 B1 * | 6/2004 | Phillips | 455/41.2 |
| 6,892,081 B1 * | 5/2005 | Elomaa | 455/575.1 |
| 6,950,645 B1 * | 9/2005 | Kammer et al. | 455/343.1 |
| 2002/0111140 A1 * | 8/2002 | Kim | 455/41 |

OTHER PUBLICATIONS

Kyunghun Jang et al; "Efficient Power Management Policy in Buetooth"; IEICE Transactions on Communications, vol. 84, Part 8; pp. 2186-2192, Aug. 2001.
Simon Baatz et al.; "Adaptive Scatternet Support for Bluetooth using Sniff Mode"; 2001 IEEE; pp. 112-120.
C. Hariharan et al.; "Intelligent Informative Switching System using C Language for Industrial Monitoring by Bluetooth Technology"; 2002 IEEE; pp. 449-454.

* cited by examiner

*Primary Examiner*—Yuwen Pan
(74) *Attorney, Agent, or Firm*—Merchant & Gould P.C.

(57) ABSTRACT

The present invention automatically selects the wireless mode of a device. The user of a Bluetooth device has the benefit of discoverable mode with the relative safety of connectable mode. The mode of the device is automatically switched from discoverable to connectable and back based on the activity of the device. For example, the mode may be switched to discoverable mode when the device is determined to be active and to connectable mode when the device is determined to be inactive. The device may be determined to be active based on many criteria, including, but not limited to: determining when a screen associated with the device is active; determining when the device is not key locked; and determining when the device is active further comprises determining when a lid associated with the device is open.

19 Claims, 5 Drawing Sheets

BLUETOOTH SMART MODE SWITCHING FOR SECURITY AND PRIVACY

CROSS REFERENCE TO RELATED APPLICATIONS

This application claims the benefit of U.S. Provisional Application Ser. No. 60/420,363, filed Oct. 21, 2002, the benefit of the earlier filing date of which is hereby claimed under 35 U.S.C. § 119 (e).

FIELD OF THE INVENTION

The present invention relates generally to selecting modes on a device, and more particularly to wireless smart mode switching on a device.

BACKGROUND

Bluetooth is a short-range wireless technology that allows devices to exchange data without cables, providing greater flexibility in configuration. Most people today use infrared wireless devices, which have to be in line of sight of each other to operate correctly. The small degree of error allowed by the infrared devices is limiting to most users. Bluetooth devices, on the other hand, such as printers, cell phones, mice, keyboards and more, can communicate with each other as long as they are within approximately 30 feet (9.1 meters) of each other.

While Bluetooth devices are generally designed to be simple to use, users may have to select certain modes in order for other devices to communicate with them. For example, Bluetooth devices generally force the user to manually select different modes whenever it's required, such as discoverable mode to receive a music file from a friend. This can be fairly confusing to the user since many users may not understand the different Bluetooth modes. Many users, for instance, may only understand that the Bluetooth radio is on or off.

SUMMARY OF THE INVENTION

The present invention is directed at automatically selecting the wireless mode of a device. According to one embodiment, the user of a Bluetooth device has the benefit of discoverable mode with the relative safety of connectable mode.

According to one aspect of the invention, the mode of the device is automatically switched from discoverable to connectable and back when appropriate.

According to another aspect of the invention, the automatic switching of the modes is based on the activity of the device. For example, the mode may be switched to discoverable mode when the device is determined to be active and to connectable mode when the device is determined to be inactive. The device may be determined to be active based on many criteria, including, but not limited to: determining when a screen associated with the device is active; determining when the device is not key locked; and determining when the device is active further comprises determining when a lid associated with the device is open.

DETAILED DESCRIPTION OF THE PREFERRED EMBODIMENT

The present invention is directed at providing the user with the benefit of discoverable mode with the relative safety of connectable mode. The mode of the device may be automatically switched from discoverable to connectable and back again based on the characteristics of the wireless device.

Figure 1:
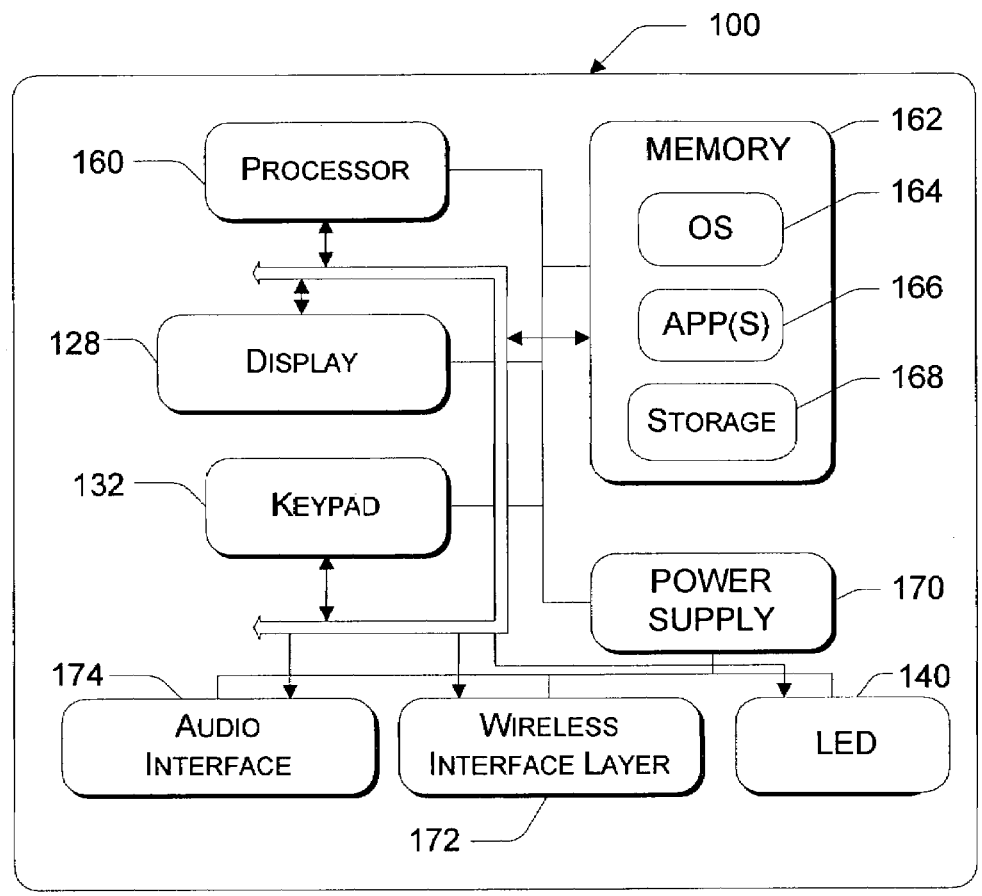
FIG. 1 illustrates a mobile computing device.

FIG. 1 illustrates a mobile computing device that may be used in one exemplary embodiment of the present invention. With reference to FIG. 1, one exemplary system for implementing the invention includes a mobile computing device, such as mobile computing device 100 that includes Bluetooth capability, or similar technology. Mobile computing device 100 includes processor 160, memory 162, display 128, and keypad 132. Memory 162 generally includes both volatile memory (e.g., RAM) and non-volatile memory (e.g., ROM, Flash Memory, or the like). Mobile computing device 100 includes operating system 164, such as the Windows CE operating system from Microsoft Corporation, or another operating system, which is resident in memory 162 and executes on processor 160. Keypad 132 may be a push button numeric dialing pad (such as on a typical telephone), a multi-key keyboard (such as a conventional keyboard). Display 128 may be a liquid crystal display, or any other type of display commonly used in mobile computing devices. Display 128 may be touch-sensitive, and would then also act as an input device.

One or more application programs 166 are loaded into memory 162 and run on the operating system 164. A smart mode switching application resides on mobile computing device 100 and is programmed to switch between modes automatically. The smart mode switching application may reside in the hardware or software of the device. Mobile computing device 100 also includes non-volatile storage 168 within memory 162. Non-volatile storage 168 may be used to store persistent information which should not be lost if mobile computing device 100 is powered down.

Mobile computing device 100 includes power supply 170, which may be implemented as one or more batteries. Power supply 170 might further include an external power source, such as an AC adapter or a powered docking cradle that supplements or recharges the batteries.

Mobile computing device 100 is shown with two types of optional external notification mechanisms: LED 140 and audio interface 174. These devices may be directly coupled to power supply 170 so that when activated, they remain on for a duration dictated by the notification mechanism even though processor 160 and other components might shut down to conserve battery power. Audio interface 174 is used to provide audible signals to and receive audible signals from the user. For example, audio interface 174 may be coupled to a speaker for providing audible output and to a microphone for receiving audible input, such as to facilitate a telephone conversation.

Mobile computing device 100 also includes wireless interface layer 172 that performs the function of transmitting and receiving communications, such as communications associated with Bluetooth communication. The wireless interface layer 172 facilitates wireless connectivity between the mobile computing device 100 and the outside world.

According to one embodiment, transmissions to and from the wireless interface layer 172 are conducted under control of the operating system 164. In other words, communications received by wireless interface layer 172 may be disseminated to application programs 166 via operating system 164, and vice versa.

Communications connections are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
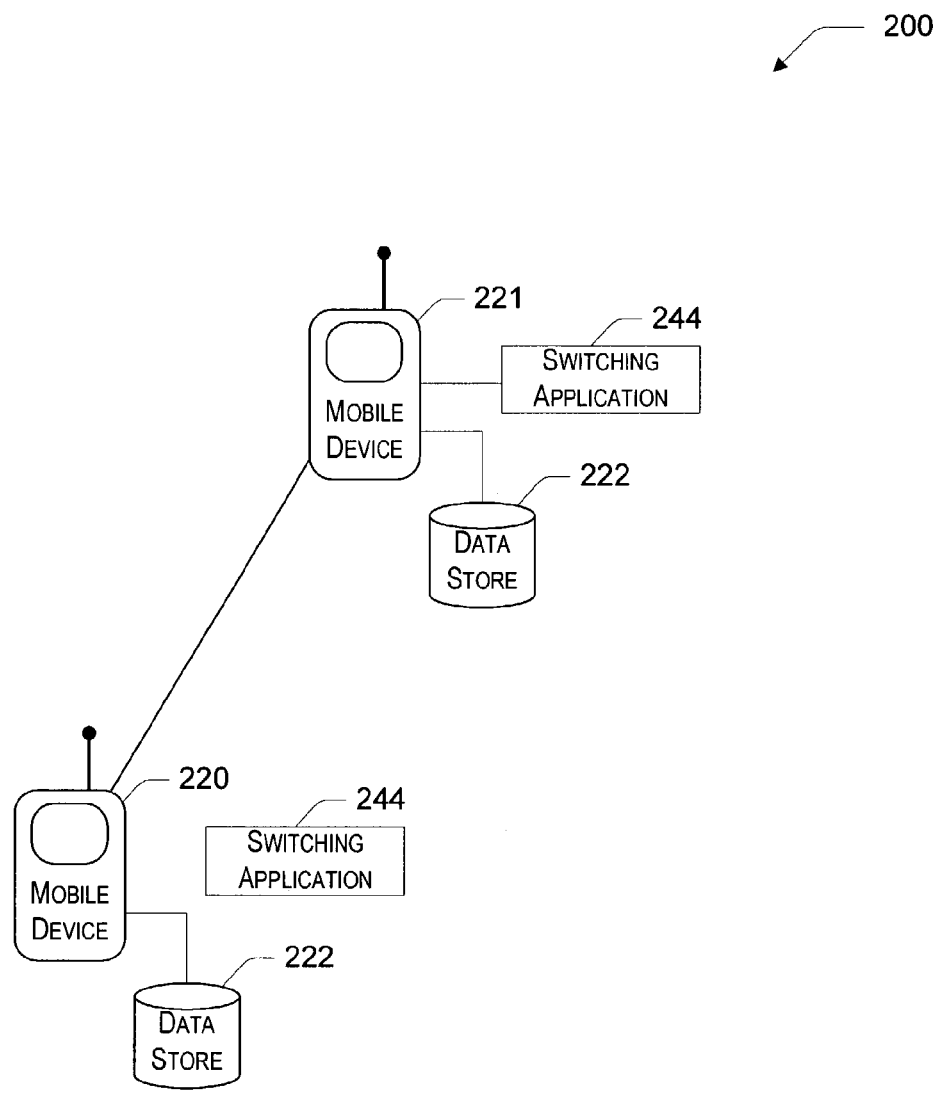
FIG. 2 shows a functional block diagram of one exemplary smart mode switching system.

FIG. 2 is a functional block diagram generally illustrating one embodiment for a smart mode switching system 200, in accordance with the present invention. In this implementation, mobile device 220 and mobile device 221 are mobile computing devices incorporating Bluetooth, such as the device described above in conjunction with FIG. 1. In the embodiment illustrated, switching application 244 is resident on mobile devices 220 and 221. As illustrated, the mobile devices maintain mobile data 222 locally in their storage 222.

Bluetooth Technology

The Bluetooth radio technology that is built into some mobile devices, such as mobile device 220 and mobile device 221, today supports at least two different modes when powered on. These modes include a "discoverable" mode and a "connectable" mode.

The Discoverable mode allows all other Bluetooth devices to see the device. A partnership with the device may be initiated once the other device is discovered.

The Connectable mode allows only partnered Bluetooth devices to see the device.

From a user experience perspective, it is easier for the user if the device is discoverable rather than connectable. When a device is in the discoverable mode, the user does not have to change any modes in order for it to be discovered from another device. For example, if a friend wishes to beam a music file to another device, the user of the other device does not have to adjust the mode on their device if it's already in the discoverable mode. In practice, however, keeping the device in the discoverable mode may be harmful to the user.

When the device is discoverable, it may face the following risks:

An attacker could discover the device and repeatedly try to connect to the device, draining its battery.

An attacker could discover the device and use it to make expensive data/phone calls, or to steal data. Discoverable mode is theoretically easier to hack than connectable mode since the device is openly giving away its identity.

Repeated incoming beams from random devices could annoy the user (e.g. spam).

The present invention is directed at providing the user with the benefit of discoverable mode with the relative safety of connectable mode. The mode of the device may be automatically switched from discoverable to connectable and back again based on the activity of the wireless device.

As discussed above, Bluetooth devices generally force the user to manually select the discoverable mode whenever it's required. For example, the user may need to manually select the discoverable mode to receive a file, such as a music file from a friend. This mode selection may be fairly confusing to the user since most users may not understand what these modes mean. The users may just understand that the Bluetooth radio is on or off. By implementing an automatic switching design, it is intended that the user will have a better experience using the device.

Figure 3:
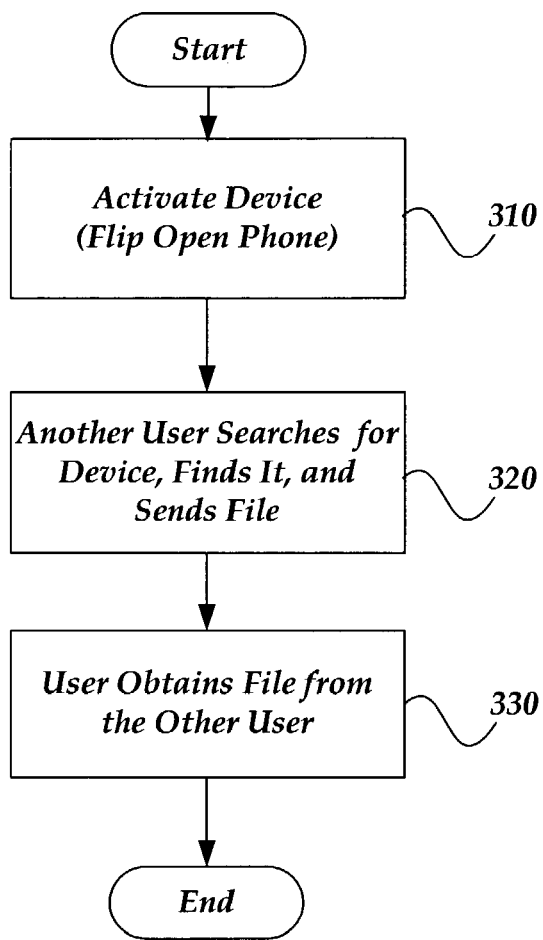
FIGS. 3 and 4 show processes relating to smart mode switching.

FIG. 3 illustrates a process relating to smart mode switching in accordance with aspects of the present invention. After a start block, the process flows to block 310, where the user activates the Bluetooth device. The Bluetooth device may be any device that supports Bluetooth, or some other similar technology. The device may include devices such as a phone, PDA, computer, and the like. When the device activated is a non-switching device, another user may attempt to search for the device but not be able find it. This causes confusion for the user, but the user may eventually find out that the discoverable mode has to be manually set on in order to be seen by other devices. Even if the user has learned that they have to enter the discoverable mode, and is not confused as how to select the appropriate mode, the user still has to go through the hassle of turning the mode on every time they desire the device to be seen by other devices. Non-switching devices automatically turn off discoverable mode after some amount of time because leaving discoverable mode on all the time normally leaves the user vulnerable to attacks. On an automatically switching device, this process is designed to be much more user friendly. Upon the user activating the device at block 310, the mode on the device may be automatically set to the mode the user desires. According to one embodiment of the invention, the discoverable mode is selected on the device when active.

Flowing to block 320, another user searches for the device from their device, finds it, and sends a file. According to this embodiment, the user does not have to manually select the discoverable mode. The process then moves to block 330, where the user obtains the file from the other user. According to this embodiment, the user obtains the file, such as a music file and plays it without ever having to manually adjust Bluetooth settings on their device. The process then moves to an end block and returns to processing other actions.

Figure 4:
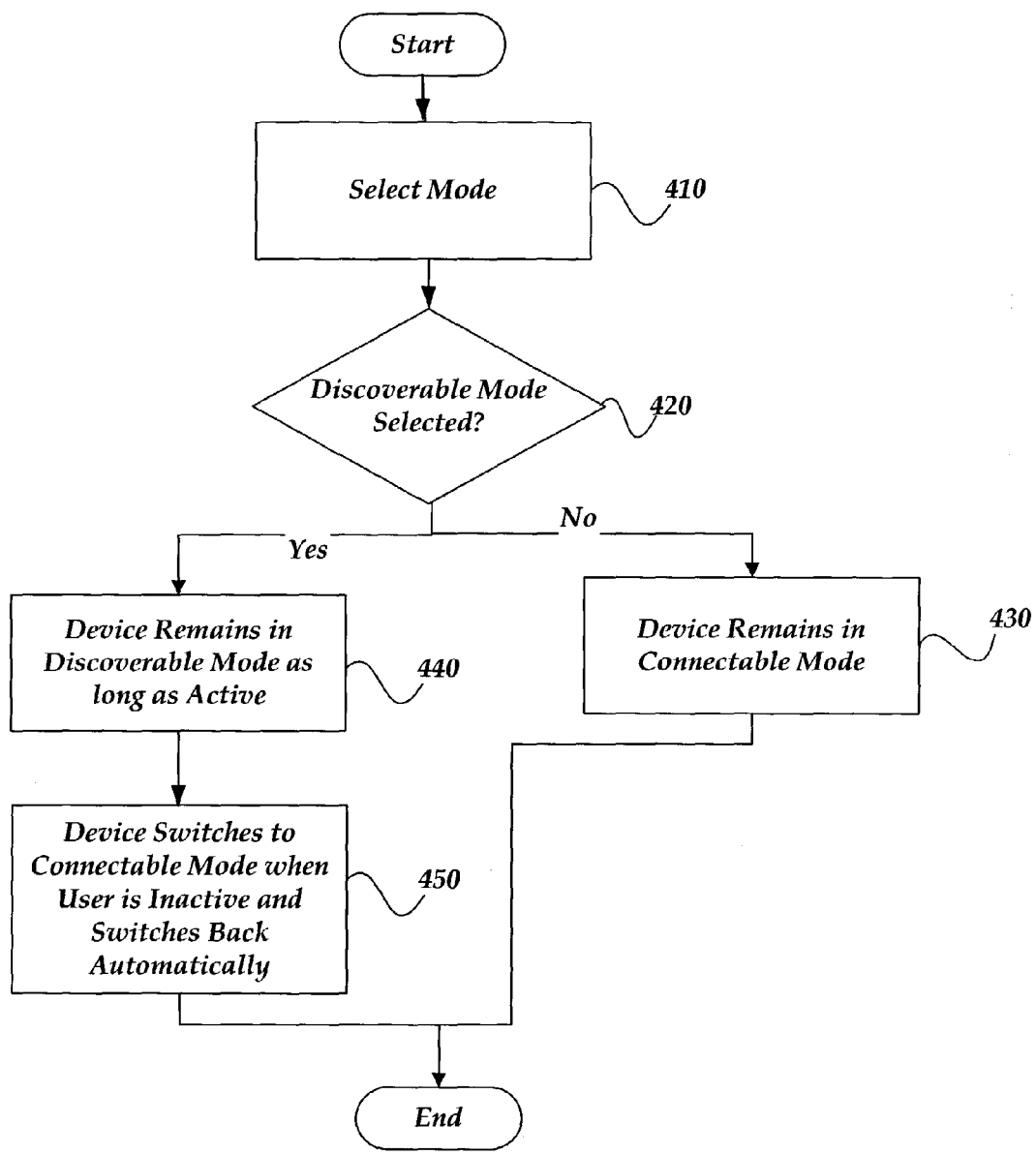

FIG. 4 illustrates a process for selecting a Bluetooth mode, in accordance with aspects of the invention. After a start block, the process flows to block 410 where a mode is selected. According to one embodiment, the mode is selected from a connectable mode and a discoverable mode. Once the mode is initially selected from the connectable and discoverable modes, the mode (based on the selection) is automatically selected from that point forward.

Moving to decision block 420, a determination is made as to what mode is selected. If the user does not select discoverable mode the process flows to block 430 where the device remains in connectable mode whenever it is on.

If the user selects discoverable mode, the process flows to block 440 where the device remains in discoverable mode as long as the user (device) appears "active." Generally, the device is considered active if the user is in the process of using the device. Active is defined in more detail below in conjunction with FIG. 5, according to an embodiment of the invention.

Flowing to block 450, when the user is "inactive," the device temporarily switches to connectable mode to provide enhanced security/privacy. When the device appears "active" again, the device automatically switches back to discoverable mode. According to one embodiment, it is assumed that the user desires to receive information and remain discoverable when he or she is actively using the device. The process then moves to an end block and returns to processing other actions.

Figure 5:
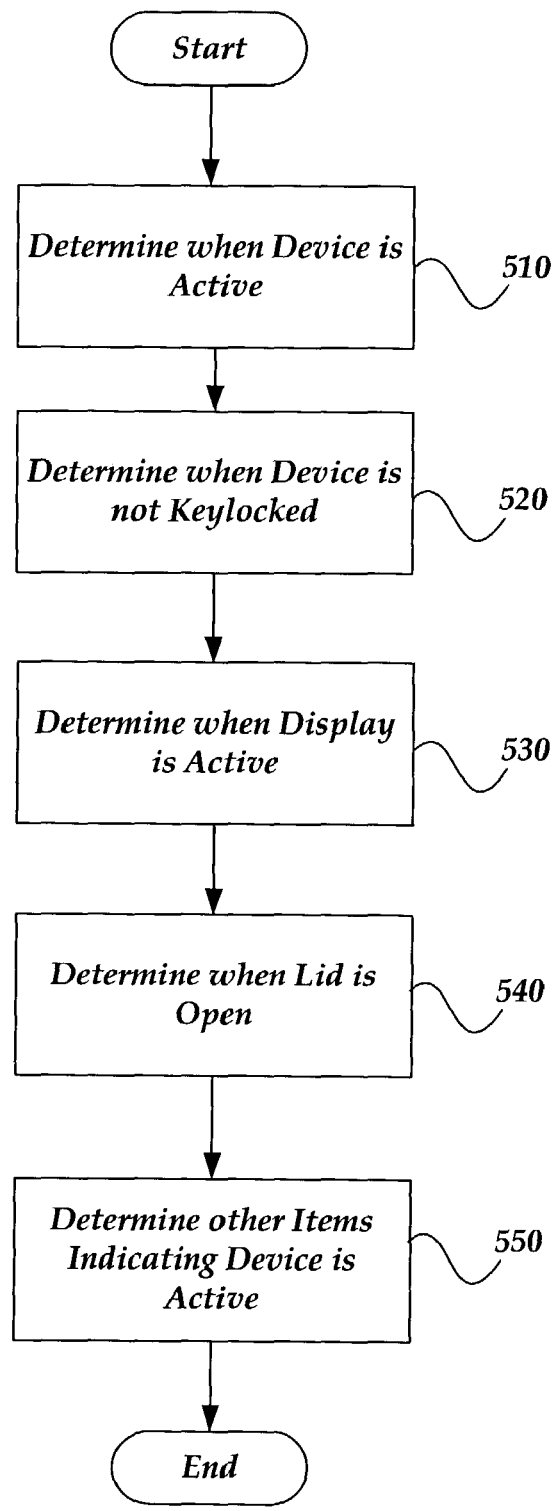
FIG. 5 illustrates a process for determining when a device is active, in accordance with aspects of the invention.

FIG. 5 illustrates a process for determining whether the device is active or inactive, according to aspects of the invention. After a start block, the process flows to block 510, where a determination is made as to whether the device is active.

According to one embodiment of the invention, the device is active when the following conditions are met. The device is not key locked (block 520) and the primary screen is active (e.g. the screen is not in low power mode and the screen is not off) (block 530). According to another embodiment, the device is active when the user has opened the lid associated with the device (block 540). For example, the user may open a lid that obscures the primary screen. In this situation, the device (such as a flip phone) will not generally be keylocked but will still be considered active when the phone is open. Many other actions may be used to indicate that the device is active (block 550). For example, any item indicating that the device is actively being used (e.g. backlight activated) may be used to determine if the device is active. When the device is not active, the device is considered inactive.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for smart mode switching on a wireless device, comprising:
   when the device is powered on:
   receiving a command from a user to select either a discoverable mode or a connectable mode relating to a wireless technology of a device; wherein the discoverable mode allows the wireless device to be discovered by other Bluetooth wireless devices that are within range of the wireless device and wherein a partnership may be initiated with the wireless device once the wireless device is discovered and wherein the connectable mode allows only partnered Bluetooth devices to discover the wireless device;
   determining when the received command indicates a selection of the discoverable mode; and when the received command indicates the selection of the discoverable mode:
      determining when the device is active and inactive; wherein determining when the device is active and inactive does not include determining when the device is powered on and powered off;
      determining when to switch the mode based upon the activity of the device; and
      automatically switching the mode selected from the discoverable mode and a connectable mode based upon the activity of the device; wherein the mode is automatically switched between the discoverable mode and the connectable mode while the device is powered on and when the device can process a user interaction; and
   determining when the received command indicates a selection of the connectable mode: and when the received command indicates a selection of the connectable mode: maintaining the device in the connectable mode when the device is both active and inactive such that whenever the wireless device is powered on it remains in the connectable mode and does not switch from the connectable mode to the discoverable mode based on the activity of the device.

2. The method of claim 1, wherein determining when to switch the mode of the device further comprises determining when the device moves between being active and being inactive.

3. The method of claim 2, wherein the discoverable mode and the connectable mode relate to Bluetooth modes.

4. The method of claim 2, wherein automatically switching the mode selected from the discoverable mode and the connectable mode based upon the activity of the device further comprises switching the mode to the discoverable mode when the device is active.

5. The method of claim 2, wherein automatically switching the mode selected from the discoverable mode and the connectable mode based upon the activity of the device further comprises switching the mode to the connectable mode when the device is determined to be inactive.

6. The method of claim 1, wherein determining when the device is active and inactive further comprises determining when a screen associated with the device is active.

7. The method of claim 1, wherein determining when the device is active and inactive further comprises determining when a lid associated with the device is open.

8. The method of claim 1, wherein determining when the device is active and inactive further comprises determining when the device is key locked.

9. An apparatus for smart mode switching modes, comprising:
   a display;
   a wireless interface comprising a discoverable mode and a connectable mode; and
   a processor configured to perform the following actions:
      when the apparatus is powered on: receiving a command from a user to select either a discoverable mode or a connectable mode relating to a wireless technology of a device; wherein the discoverable mode allows the wireless device to be discovered by other Bluetooth wireless devices that are within range of the wireless device and wherein a partnership may be initiated with the wireless device once the wireless device is discovered and wherein the connectable mode allows only partnered Bluetooth devices to discover the wireless device;
      determining when the received command indicates a selection of the discoverable mode; and when the received command indicates the selection of the discoverable mode:
         determine when the device is active;
         determine when to switch the mode between the discoverable mode and the connectable mode based upon the determination of when the device is active; wherein the mode is switched between the discoverable mode and the connectable mode while the device is powered on and while the device can determine user interaction; and
         automatically switch the mode based upon the determination of when the device is active; and
      determining when the received command indicates a selection of the connectable mode: and when the received command indicates a selection of the connectable mode: maintaining the device in the connectable mode when the device is both active and inactive.

10. The apparatus of claim 9, wherein determining when the device is active further comprises determining when the display is active.

11. The apparatus of claim 9, further comprising a lid; wherein determining when the device is active further comprises determining when the lid is open.

12. The apparatus of claim 9, further comprising a keypad; wherein determining when the device is active further comprises determining the keypad is locked.

13. The apparatus of claim 9, wherein the wireless interface supports Bluetooth.

14. The apparatus of claim 9, wherein automatically switching the mode based upon the activity of the device further comprises switching the mode to the discoverable mode when the device is active.

15. The apparatus of claim 9, wherein automatically switching the mode based upon the activity of the device further comprises switching the mode to the connectable mode when the device is determined to be inactive.

16. A system for smart mode switching, comprising:
a display;
a wireless interface configured to connect with other devices comprising a discoverable mode and a connectable mode; and
a processor configured to perform the following actions:
when the apparatus is powered on: receiving a command from a user to select either a discoverable mode or a connectable mode relating to a wireless technology of a device; wherein the discoverable mode allows the wireless device to be discovered by other Bluetooth wireless devices that are within range of the wireless device and wherein a partnership may be initiated with the wireless device once the wireless device is discovered and wherein the connectable mode allows only partnered Bluetooth devices to discover the wireless device;
determining when the received command indicates a selection of the discoverable mode; and when the received command indicates the selection of the discoverable mode:
determine when the device is active;
determine when to switch the mode between the discoverable mode and the connectable mode based upon the determination of when the device is active; wherein the mode is automatically switched between the discoverable mode and the connectable mode while the device is powered on and the processor can process user interaction; and
automatically switch the mode based upon the activity of the device; and
determining when the received command indicates a selection of the connectable mode: and when the received command indicates a selection of the connectable mode: maintaining the device in the connectable mode when the device is both active and inactive.

17. The system of claim 16, wherein the wireless interface supports Bluetooth.

18. The system of claim 17, wherein automatically switching the mode based upon the activity of the device further comprises switching the mode to the discoverable mode when the device is active.

19. The system of claim 18, wherein automatically switching the mode based upon the activity of the device further comprises switching the mode to the connectable mode when the device is determined to be inactive.

* * * * *